United States Patent Office 3,546,621
Patented Dec. 8, 1970

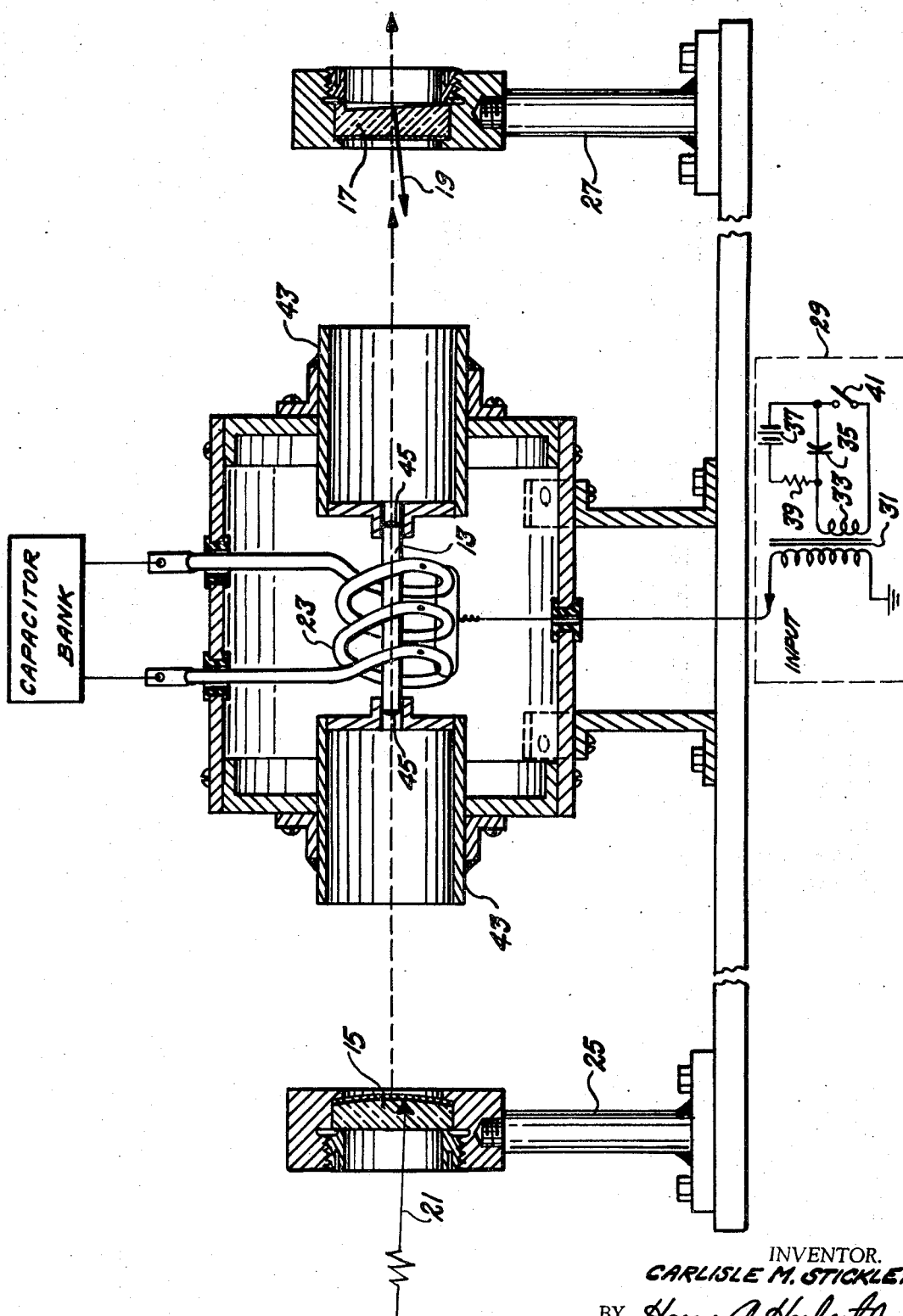

3,546,621
LASER BRIGHTNESS GAIN AND MODE CONTROL BY OPTICAL COMPENSATION FOR DISTORTION
Carlisle M. Stickley, Sudbury, Mass., assignor to the United States of America as represented by the Secretary of the Air Force
Filed May 15, 1967, Ser. No. 639,938
Int. Cl. H01s 3/08
U.S. Cl. 331—94.5                    1 Claim

ABSTRACT OF THE DISCLOSURE

A technique for reducing the beam divergence and correspondingly increasing the mode intensity of a long pulse ruby laser by compensating for the optical distortion produced in the rod brought about by the nonuniform absorption of the pump light. An external mirror having a curvature opposite to that induced in the rod compensates for pump induced distortion and produces a brightness gain of about 100 with single transverse mode operation at pump energies up to 60 percent over threshold.

---

This invention relates to a technique for achieving a brightness gain of the order of 100 simultaneously with single transverse mode operation ($TEM_{oo}$) of a long pulse ruby laser at pump energies greatly exceeding threshold. More particularly, the invention is concerned with providing a system for compensating for the optical distortion produced in a laser rod as a result of the nonuniform absorption of pump light by use of an external mirror having a curvature opposite to that induced in the laser rod, thereby reducing the beam divergence and increasing the mode intensity.

The excited transverse modes of ruby lasers with attached mirrors are typically complex and of high order and result in low brightness. Poor quality ones oscillate in filaments and have even lower brightness in the far field. The brightness can be increased somewhat by using external mirrors since the mode diameter increases, the cavity Q increases, and the mode divergence decreases as the cavity is lengthened. Somewhat lower order modes are excited in this manner since there larger cross-section area, compared to the same transverse modes with mirrors on the end of the laser rod, more closely matches the area of the inverted region of the ruby rod. The match is still poor, however, and still results in modes being excited whose divergence is twenty or more times the plane wave diffraction limit of the end of the laser rod.

In many ruby lasers the mismatch can be due to filamentary operation, but in the limit of good optical quality, that is, freedom from internal path length variations parallel to the mirrors, the beam divergence is determined by the approximately spherical optical distortion brought about by the nonuniform absorption of pump light. The distortion is such that the plane parallel ruby rod becomes a slightly positive or negative lens depending on the product of the rod radius and doping concentration. Only a small amount of this type of distortion is necessary to cause the modes to be those of a curved mirror resonator, with an accompanying reduction in brightness, rather than a plane parallel resonator. Since the pump induced distortion is reproducible it is possible to compensate for this by means of an external mirror having a curvature opposite to that induced in the rod. Thus, sinusoidal modes can be excited when the mirror is precisely matched to the internal curvature of the rod. The brightness in the far field, as measured in watts/cm.²/ stearadian, will be increased as a result of the decrease in mode divergence and the mode intensity will increase since it will have a greater volume.

Accordingly, it is an object of the invention to provide a technique for increasing the brightness of a laser by compensating for the optical distortion of the laser medium when it absorbs pump energy. This is accomplished by providing a mirror having a curvature precisely chosen to offset the distorted wavefront and thereby reduce its divergence.

Another object of the invention is to provide technique for achieving single transverse mode operation of a laser without the use of extra elements in the cavity which would degrade the optical quality of the laser. Extra elements in the laser cavity would also tend to become damaged at high power levels as a result of absorption of energy.

Still another object of the invention is to provide a laser having an external mirror which is designed to precisely defocus the impinging wavefront to the same degree that it was focused after propagating through the laser rod. This arrangement serves to increase the power output and mode stability of the laser in the desired $TEM_{oo}$ mode.

A further object of the invention is to provide a long pulse ruby laser having a generated beam whose divergence approaches that of the diffraction limit of the laser rod. This is accomplished without the use of a collimating lens or lenses while at the same time permitting successful mode selection and increased brightness.

These and other objects, features and advantages will become more apparent after considering the following detailed description taken in conjunction with the annexed drawing and appended claims.

In the drawing wherein like reference characters refer to like parts, the figure shows a solid state laser arrangement according to the present invention.

Referring now to the drawing, there is shown a laser system which includes an active laser element such as a ruby rod 13. Reflecting elements or mirrors 15 and 17 are disposed in spaced relationship and in optical alignment to intercept the radiation energy emitted by the laser rod 13 and return it to the element 13, thereby forming the optical cavity of the laser system.

In the embodiment of the invention herein described, the mirror 15 is substantially 100 percent reflective, while the mirror 17 is semitransparent or 85 percent reflective. The face of the mirror 17 toward the laser element 13 is optically flat and parallel to the face thereof, while the back of the mirror 17 is slightly angled in order to reflect any radiation from that surface as shown by the arrow 19 away from the laser rod 13. The radius of curvature of the mirror 15, indicated as 21 on the drawing, is provided to compensate for the distortion of the laser rod 13 which occurs when the flash tube 23 supplies the pumping energy to excite the laser rod 13. The thermal distortion thus created causes the ends of the laser rod 13 to adopt a degree of curvature and, therefore, operate in the manner of a thick lens and introduce a corresponding distortion in the wavefront.

The mirrors 15 and 17 are supported so as to be in optical alignment with the laser rod 13 by the support members 25 and 27, respectively. The signal for flashing the flash tube is provided by the triggering circuit 29 which includes a step-up transformer 31 having a primary 33 which is energized by a circuit including serially connected capacitor 25, battery 37, and resistor 39. The closing of switch 41 serves to complete the circuit and initiate the flash in the flash tube 23.

To determine the radius of curvature 21 of the mirror 15, it is first necessary to know $f$, the focal length of the ruby rod 13 when considered as a thick lens, and $d$, the measured distance between the principal plane of the ruby rod 13 (acting as a thick lens) and the mirror 15.

This can be accomplished most accurately through measurement of the transverse mode beat frequency of the cavity containing the rod to be compensated and which is being pumped under approximately the same pumping conditions which will be used for the compensation.

The resonant frequencies for a cavity of this type are given by $$v = \frac{cq}{2L} + \frac{c}{2\pi L}(m+n+1)\cos^{-1}\sqrt{G_1 G_2} \quad (1)$$

where $q$ is the longitudinal mode number, $m$ and $n$ are the transverse mode numbers, $c$ is the speed of light in vacuum, L is the optical length of the cavity and $G_1$ and $G_2$ are dimensionless parameters describing the design of the resonator. The difference frequency between transverse mode ($\Delta q = 0, \Delta(m+n) = 1$) can be written as $$v = \frac{c}{2\pi L}\cos^{-1}\sqrt{G_1 G_2} \quad (2)$$

when the radius of curvature 21 of mirror 15, designated as $R_1$, is equal to infinity, $\Delta v$ becomes $$\Delta v = \frac{c}{2\pi L}\cos^{-1}\left(1\frac{d}{f}\right) \quad (3)$$

Solving for $f$ $$f = \frac{d}{1 - \cos\left(\frac{2L\pi \Delta v}{c}\right)} \quad (4)$$

This compensation procedure was carried out on a rod held with holders 43 designed to minimize hot air seepage into the optical path. The flat end surfaces 45 of the rod 13 were antireflection coated with one layer of magnesium fluoride and were aligned parallel to and midway between the coated mirrors 15 and 17.

The transverse mode beat frequencies were measured with an image converter camera using streak photography in the far field of the beam. The optical length (L) of the mirror separation was 52.9 cm. From an examination of the streak photographs, the information contained therein leads to the conclusion that $\Delta v = 30$ mHz.

Having obtained the value for $\Delta v$, $f$, the focal length of the laser rod 13 (according to (4)) is 445 cm. Since $d = 24$ cm. then R, the radius of curvature of the mirror 15, is equal to $-421$ cm., according to the formula $R = +(f-d)$.

The convex mirror 15 was provided with a curvature of 4.21 meters and a 98 percent reflectance multiple-layer dielectric coating. The major improvement noted in the laser operation by placing the compensated mirror 15 in position indicates that the laser oscillated at all times in the $TEM_{00}$ mode and had a beam divergence of a factor of four less than the divergence for uncompensated operation. This in conjunction with the fact that the average spike height increased by a factor of 5.5, results in a brightness enhancement of $5.5 \times (4.25)^2 = 99$. It also appears from spiking photographs that the total energy output remained unchanged.

A procedure has been outlined for precise compensation of laser cavities for the distortion in the laser material arising from nonuniform absorption of pump energy. Although the example hereinbefore described is concerned with one particular laser material and design, the procedure is equally effective for increasing the magnitude of brightness of lasers in general. Even greater increases than this can be achieved by carrying out the compensation procedure carefully with laser rods of superior passive optical quality. Furthermore, this procedure is an excellent one for mode control since, first, no energy absorbing elements are used in the cavity, secondly, the mode volume is increased, thus increasing the power in the mode and its stability, and thirdly, the beam divergence can be made to approach the plane wave diffraction limit of the laser system without the use of extra lenses. It should also be noted that laser rods with polished lateral surfaces are the better type to use for long pulse operation since the curvature can be made to change very little in the central region of the rod in comparison with rods with rough sides. Further, it should be clear that many advantages are to be gained by using laser materials having excellent optical quality.

Although the invention has been illustrated and described in terms of a preferred embodiment thereof, it will be apparent to those skilled in the art that certain changes, alterations, modifications and substitutions, particularly with respect to the construction details, can be made in the arrangement and location of the various elements without departing from the true spirit and scope of the appended claims. For example, the shape of the compensating mirror 15 may be concave instead of convex, as shown, under certain conditions where the laser rod reacts differently to the pump-induced distortion and the mirror is provided with a curvature opposite to that induced in the rod. Also, the compensated laser operates in a stable manner and there appears to be no transverse mode hopping at sixty percent over threshold.

The term "long pulse" is used in the foregoing specification as an example of one type of laser which is improved by utilizing my invention. The concept is applicable to all time regimes of operation, such as, long pulse, Q-switched, and ultrashort pulses. Also, even though the invention is described in terms of ruby lasing material, it should be understood that the hereinbefore described procedure is equally valid for all types of lasers that have distortions arising for any reason, not only thermal, and the compensation procedure provides for the correction of distortion in the laser rod arising from any cause.

Having thus set forth and disclosed the nature of my invention, what I claim and desire to secure by Letters Patent of the United States is:

1. In a laser system having an active laser element, pumping means for energizing said laser element, a first reflective member in optical alignment with and spaced from one end of said laser element, said first reflective member being semitransparent to allow passage of a portion of the energy therethrough, a second reflective member in optical alignment with and spaced from the other end of said laser element, said second reflective member being substantially totally reflective to propagate the wave-front back through the laser medium; the improvement comprising compensating means for correcting for pump-induced distortion in said laser element including a curvature on the surface of said second reflective member, said curvature being opposite to the distortion of the laser element and having a radius according to the formula $R = +(f-d)$, where $f$ is the focal length of the laser element and $d$ is the distance from the principal plane of the laser element, thereby increasing the brightness of the laser by reducing the divergence of the beam in the far field and constraining the laser to oscillate in only the lowest order Gaussian mode.

References Cited

UNITED STATES PATENTS 3,362,285  1/1968  Hora _____ 331—94.5

WILLIAM L. SIKES, Primary Examiner